United States Patent [19]
Grünenfelder et al.

[11] Patent Number: 6,097,701
[45] Date of Patent: Aug. 1, 2000

[54] DATA STREAM SHAPER

[75] Inventors: Reto Grünenfelder, Dietlikon; Thomas Stock, Zürich, both of Switzerland

[73] Assignee: Alcatel, Paris, France

[21] Appl. No.: 08/987,897

[22] Filed: Dec. 10, 1997

[30] Foreign Application Priority Data

Dec. 13, 1996 [CH] Switzerland .............................. 3075/96

[51] Int. Cl.⁷ .................................................. H04L 12/26
[52] U.S. Cl. ............................................ 370/235; 370/395
[58] Field of Search ..................................... 370/395, 229, 370/230, 231, 232, 233, 234, 235, 236, 237, 238, 239, 240

[56] References Cited

U.S. PATENT DOCUMENTS

| | | | |
|---|---|---|---|
| 5,313,579 | 5/1994 | Chao ........................................ | 395/200 |
| 5,448,567 | 9/1995 | Dighe et al. ............................ | 370/94.2 |
| 5,577,035 | 11/1996 | Hayter et al. .............................. | 370/60 |
| 5,719,865 | 2/1998 | Sata ......................................... | 370/395 |
| 5,745,477 | 4/1998 | Zheng et al. ............................. | 370/230 |
| 5,818,815 | 10/1998 | Carpentier et al. ..................... | 370/218 |
| 5,831,971 | 11/1998 | Bonomi et al. ......................... | 370/230 |

*Primary Examiner*—Huy D. Vu
*Assistant Examiner*—Dung Trinh
*Attorney, Agent, or Firm*—Ware, Fressola, Van Der Sluys & Adolpshon LLP

[57] ABSTRACT

A shaper (1) in a stream of data packets provides for compliance with the agreements about the packet traffic of each virtual connection. It contains means (11) for the intermediate storage and read-out of data packets and for extracting the packet clock, furthermore a control (12) which reads the packets of the different connections into the data stream at the right time. The selection of the data packet takes place on the basis of a rank which is established for each data packet located at the front of the virtual waiting line of the individual connection. With each packet clock the rank is incremented in accordance with the agreed bandwidth for this connection; thus, for each clock a new calculation for the highest two connections for which a data packet advances again to the head of the virtual waiting line, is sufficient. Two processing units (21, 24) are provided. Reference magnitudes (Bk) of individual connections are calculated in a single first processing unit (21); in a second processing unit (24) which is available once for each connection, they are also weighted, updated and provided with the priority (PRIO).

12 Claims, 2 Drawing Sheets

DATA STREAM SHAPER

TECHNICAL FIELD

The invention is in the area of flow control of data packets in data networks, and concerns a shaper for a stream of data packets particularly an ATM traffic stream, with means for the intermediate storage and read-out of data packets from individual connections and the extraction of the packet clock. It is also directed to a method of shaping a stream of data packets, particularly from an ATM traffic stream, while taking a priority into consideration and complying with agreed traffic parameters for each connection, where arriving data packets of individual connections are inserted into a waiting line and the packet clock is determined.

BACKGROUND OF THE INVENTION

In an effort to optimally load data networks, agreements are reached with the users regarding the transmission services to be provided and used, and the pertinent traffic parameters. The data packets are discriminated if the agreement is not complied with, meaning they are discarded in most cases. But since data packets undergo different delays in time during their transportation through the network, different values result with respect to traffic parameters, depending on the location in the network. This situation will be explained in greater detail with the example of data traffic in accordance with the Asynchronous Transfer Mode (ATM).

The ATM comprises different transmission modes, so-called transfer capabilities. They are characterized by their English designations, which are: Constant Bit Rate (CBR), real time Variable Bit Rate (rt-VBR), non real time Variable Bit Rate (nrt-VBR), Unspecified Bit Rate (UBR), ATM Block Transfer (ABT) and Available Bit Rate (ABR). Most of these transmission modes have been standardized by the applicable committees. The network makes these transfer capabilities available to the user for the transportation of his data. After the user has selected an adequate mode for a connection the user and the network agree on the pertinent parameter values. Finally a contract is agreed between the user and the network on the basis of these parameters and the method used to monitor the connection.

Usage Parameter Controls (UPC) are established in certain areas of the network, particularly in the User Network Interface (UNI), or in the Network Network Interface (NNI), where a so-called policing mechanism controls the compliance with the contract. Presently this policing uses a so-called generic Cell Rate Algorithm (GCRA) for all transfer capabilities except for the ABR, with the contract parameters Increment I and Limit L. The Dynamic Generic Cell Rate Algorithm (DGCRA) with the contract parameters Increment I(t) and Limit L is provided for the ABR. But other methods are not excluded according to the ITU-T recommendation. Cells, which is what the data packets in the ATM are called, which do not arrive in accordance with the contract agreements, are discriminated by the policing mechanism, meaning they are especially identified, or in most cases simply discarded, therefore eliminated from the data stream.

As a rule a user complies with the contract by outputting the respective data stream at the terminal. It is also known to use shapers either at the terminal itself or at a network gateway element, for shaping the data stream. As a rule they are based on a policer equipped for this purpose. This is cited for example by EP-A-0711055, which discloses the application of a method to measure characteristic magnitudes in a data stream, and the corresponding device for influencing a data stream. Furthermore in order to influence the data stream, a return message to the source can be provided near the source.

Different treatments in the network influence an ATM traffic stream. The time intervals between the cells of a predetermined connection can therefore be different in different areas of the network. The cause can be the queuing of the data packets originating in the terminal, into a traffic stream in a Customer Premises Network (CPN) located before the ATM network, or statistical multiplexing in the ATM network itself. In ABR traffic this is made worse by the traffic parameters which can continuously change over time. The fluctuations in the arrival time of the data packets of a connection, which are caused by the network, can affect a certain area of the network in a way so that there is always a short-term injury of the contract, even though the user (the source) is complying with the contract. This is particularly fatal in the policing area, where data packets are discarded if their arrival does not comply with the contract.

SUMMARY OF THE INVENTION

Thus there is the object of ensuring that the number of contract injuries remains at a minimum in a selected area of the network, especially before a policing. This object is achieved by a shaper for a stream of data packets, particularly an ATM traffic stream, with means for the intermediate storage and read-out of data packets from individual connections and the extraction of the packet clock, having an evaluation unit which determines the instant of the last read-out of a data packet during the packet clock period for each connection based on the current time, the agreed traffic parameters and the priority of a rank which is decisive for the selection of the data packets to be read-out next.

This object is also achieved by a method of shaping a stream of data packets, particularly from an ATM traffic stream, while taking a priority into consideration and complying with agreed traffic parameters for each connection, where arriving data packets of individual connections are inserted into a waiting line and the packet clock is determined, performing the following process steps during a packet clock period; determining for each connection a reference magnitude from the traffic parameters and the time elapsed since the last packet departure; determining for each connection a rank based on the priority and the reference magnitude; determining the connection with the highest rank, and read-out of the data packet of the determined connection from the waiting line.

A shaper in a stream of data packets has means for the intermediate storage and read-out of individual connections of data packets, and for extracting the packet clock. To fulfill its task the shaper needs a so-called scheduler, namely a controller which reads the packets of the different connections into the data stream at the right time. In accordance with the invention the selection of the data packet is made on the basis of a rank established by an evaluation unit for each data packet located at the front of the virtual waiting line of the individual connection. The established ranks are preferably stored in a memory which can be accessed by the scheduler. In addition to the running time, the agreed connection parameters are taken into consideration for the evaluation. They are preferably available in memories located before the evaluation unit, which can be accessed as necessary.

The continuous calculation of a rank for each connection can be simplified to a large degree by specially configuring the shaper and the method of shaping the data stream. A rank comprises a mode class which determines the priority of the packet departure, and a weight which is decisive for the sequence within the same mode class. The weight increases with each packet clock in accordance with the agreed bandwidth of this connection. An outstanding event for a connection is the renewed advancing of a data packet to the head of the (virtual) waiting line that belongs to the connection. This takes place after the departure of a data packet from this connection as long as another one is waiting in the line, or when a data packet of any connection which arrives during the same clock period reaches the head of the waiting line directly. Thus there are at most two such outstanding events per clock period. But only those make a renewed calculation of a rank necessary. For all other ranks only the weight increases linearly with time, and updating them continuously is sufficient.

In a preferred embodiment the invention provides a subdivision of the evaluation unit into two parts. The individual reference magnitudes of connections are calculated by a simply constructed first processing unit. A second processing unit, which is available once for each connection, updates them only by weighting and provides them with the priority. The calculation of the reference magnitude by the first processing unit only needs to be used for not more than two connections per clock period. The second processing unit preferably contains a counter which is initialized by the reference magnitude derived from the first processing unit, which counts packet clocks that are modified as a function of a traffic parameter, and whose status together with the priority provides the rank.

With the preferred method of shaping a stream of data packets, this subdivision is mirrored by two processing units. In each packet clock the method determines for which connections a data packet advances to the head of the waiting line, either when the packet departs from this connection and a waiting packet takes its place, or a packet from any connection arrives and goes directly to the head of the virtual waiting line. Reference magnitudes are calculated anew for this (these) connection(s); for all other connections the reference magnitudes are incremented, and the increment depends on the traffic parameter which was agreed for this connection.

BRIEF DESCRIPTION OF THE DRAWINGS

The invention will be explained in greater detail by means of FIGS. 1 to 3, which show the following.

BEST MODE FOR CARRYING OUT THE INVENTION

The possibility of storing and selectively routing data packets or cells, as they are called for transmissions in the ATM, is indispensable. The actual storage place for the lines and the memory management may be separate in this case. Most of the time the memory management includes a so-called scheduler, a switching element containing a flow chart that may have to be continuously updated, which determines when and/or under what conditions a memory input is to be treated in what way. A simple example of a scheduler is a clock generator which controls the read-out of a FIFO register, at the input of which the data can arrive asynchronously. For example also well known are more complex schedulers which service cells at the heads of a number of waiting lines as follows: a cell containing the highest priority is selected; from several candidates with the same value the next one in a predetermined sequence is selected in each case (Round Robin Inquiry), or the one that has already waited the longest time. The kind of physical configuration of a buffer memory is not important for the invention. When describing the storing, the sequencing in waiting lines and the reading of data packets or cells and similar processes, they refer to the logical operations without restriction to a physical embodiment. In the same way the input or output designation characterizes the logical interrelationship of the circuit components and data streams to each other, and does not describe a physically tangible object.

Figure 1:
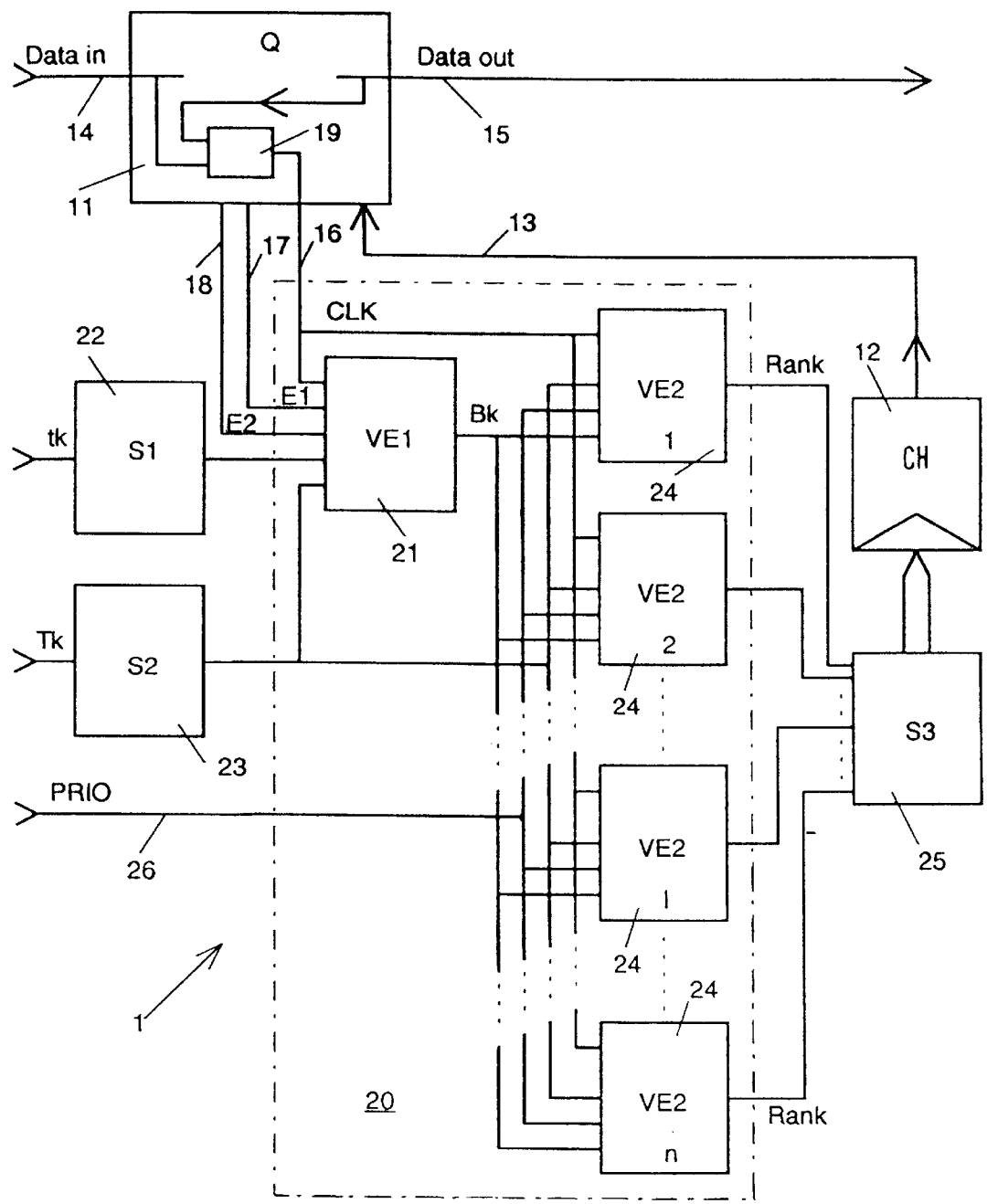
FIG. 1 an elementary diagram of the shaper with the essential cooperating components.

FIG. 1 shows the elementary diagram of a shaper 1 according to the invention, with the intermediate memory 11 and the scheduler 12 (SCH) which influences the latter via the connection 13. The intermediate memory 11 accepts the data packets arriving at the input 14, acquires the connection information and inserts the packet in its corresponding place in the respective waiting line. The data packets leave from the output 15 under the influence of the specifications from the scheduler SCH 12. Thus the intermediate memory 11, designated by Q in the figure, buffers the data packets in individually connected waiting lines. The cell clock is needed for the correct processing of the cells (data packets) in time. It can be extracted from the cell stream. The cell clock extraction function is implicitly contained in the intermediate memory 11; in the diagram of FIG. 1 it is indicated by a functional block 19. Through the output 16 the clock is made available to other components of the shaper.

As a peculiarity for the shaper 1, the intermediate memory 11 furthermore delivers two event values E1 and E2 via outputs 17 and 18 for a downstream evaluation unit 20. In this case the event value E1 contains information about the virtual connection i to which the cell leaving the buffer Q belongs, and whether another cell is also present in the waiting line of the same connection. The event value E2 contains a statement about whether a cell arrives during the cell clock period under consideration and then immediately advances to the head of the waiting line of its virtual connection j, and to which connection j it belongs.

The evaluation unit 20 as well as the components connected upstream and downstream of it are indicated in greater detail in a preferred embodiment in FIG. 1. The further description of the invention takes place by means of this special embodiment, but is not limited thereto; possible variations and generalizations are also pointed out.

In addition to the event values, the evaluation unit 20 processes the contract parameters or magnitudes derived therefrom; in FIG. 1 it accesses them via two memories (S1, S2) and considers a priority for each connection. From all of these indications it determines a rank for each of the n possible connections, which is decisive for determining a cell which is being read as the next one. In the preferred embodiment the determined ranks are retained in a third memory S3, the evaluation memory 25, which the scheduler 12 is able to access.

The cell clock CLK and the event values E1 and E2 are routed to inputs of the single first processing unit 21, which in the preferred embodiment is a component of the evaluation unit 20. Via two further inputs the latter can access a first memory S1, the transmission time memory 22, and a second memory S2, the bit rate memory 23. The result of the first processing unit VE1 are two reference magnitudes Bk, each of which is assigned to a virtual connection i or j.

In the following the index i or j respectively designates a single individualized virtual connection, by contrast the index k designates an applicable one of several possible connections: k∈{i, j} or k∈{1,2, . . . , n) or similar.

A second processing unit 24 VE21, VE22, . . . , VE21, . . . , VE2n is provided per virtual connection that can be processed. For example n can be 2048. The reference magnitude Bk calculated in the first processing unit 21 is used as initialization for the corresponding second processing unit VE2k. Each of the second processing units 24 continuously updates the reference magnitude Bk and together with the indication about the priority 26 (PRIO) generates a value, e.g. in the form of a bit sample, which is retained as the rank for the pertinent connection. In FIG. 1 this takes place in the evaluation memory 25 (S3).

The object of the first processing unit 21 is essentially to evaluate the current values for the connections concerned with the respective clock and to calculate none, one or two connections from them. The processing trigger is always the departure of a cell from the intermediate memory or the arrival of a new cell, or both. The reference magnitude calculation refers to the connection i of the departed cell. If a cell of connection j arrives during the clock period under consideration and immediately advances to the head of the waiting line j, a reference magnitude calculation must also take place for this connection. Not more than two calculations are to be performed per clock period, and only one for the time average. The current values playing a role in the further sequence and the calculation are the running time t, the number i of the departed cell's connection, the earliest possible time ti for the departure of another cell of connection i, and the reciprocal value Ti of the agreed bandwidth of the connection i. If a second calculation is to be performed, a role is also played by the number j of the connection of a cell which immediately advances to the head of its waiting line when it arrives, the earliest possible time tj for the departure of a cell of the connection j, and the reciprocal value Tj of the bandwidth of connection j. During the same clock period the calculated reference magnitude Bk for a predetermined connection is routed to the corresponding second processing unit.

The processing of the data always takes place during the clock period of the arriving or departing data packets or cells. The clock time is determined from the maximum number of possible cells that are able to arrive or depart per time unit. The running time t in the sense of the present explanations is an absolute time which however is only acquired at discrete instants. The next distinguishable instant after a predetermined time t is at tΔ, where Δ identifies the clock period. Thus the interval (t, tΔ) is always available for the processing. The times tk or ti and tj are also absolute times, but which may be discreted in a finer manner than for exactly one cell clock. The reciprocal bandwidth values Tk are time periods measured in clock periods which may also contain fractions of clock times.

The representation of the running time t is made in a suitable manner inside the system, for example as the number of clock periods referred to a predetermined value at the instant of output. tk and Tk are represented accordingly and in this case fractions of clock periods are also considered in general. As a rule internal processing clocks are defined in the equipment design with shorter clock periods. To represent the fractions, it is sufficient most of the time to discrete with such an internal clock.

Figure 2:
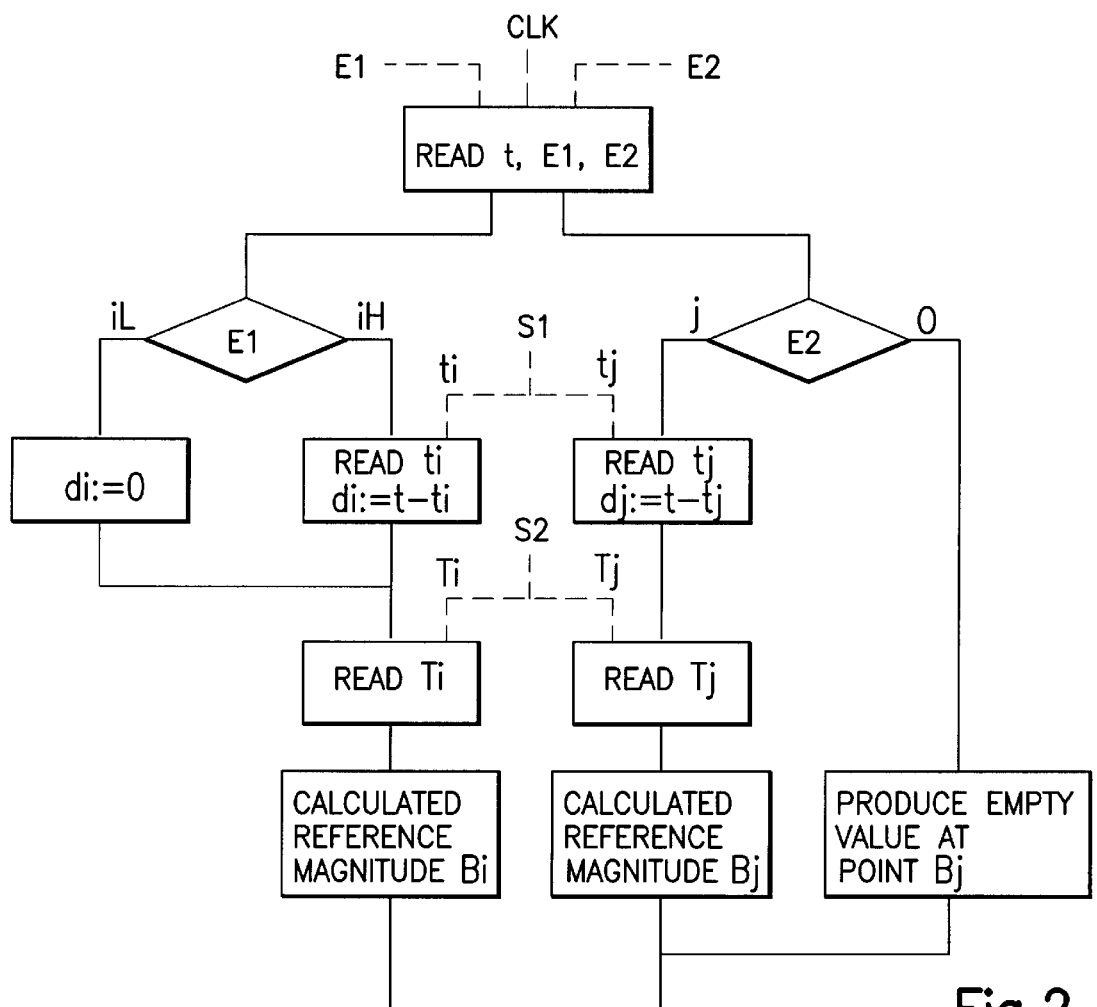
FIG. 2 a schematic operational sequence of the first processing unit.

The first processing unit 21 (VE1) is defined by its function as described in detail by FIG. 2 in the following. This can be carried out in the most diverse manner, for example as an electronic circuit via an ASIC (Applicant Specific Integrated Circuit), and presents no special challenge to the expert. FIG. 2 schematically illustrates the processing steps that take place in the first processing unit. Immediately before the beginning of a clock whose instant is identified by t, the cell of connection i has departed from the intermediate memory Q, to a buffer with virtual waiting lines for each connection and a corresponding buffer management. In this way two events were determined in the buffer and are routed to the first processing unit. A first event takes place with the departure of a cell from the intermediate memory. It is characterized by its event value E1, which on the one hand contains the number i of the departed cell's connection, and on the other the information about whether a cell is still present in the waiting line i. A second event takes place when at time t an arriving cell is written directly to the foremost position in the buffer, thus when the waiting line of the corresponding connection j was empty. It can be characterized by an event value E2, which contains the number of the connection j, or an outstanding value which is not used as the number of a connection, identified by 0 in this case, if the event does not take place.

The first processing unit calculates a reference magnitude Bi with the specifications shown in the left part of FIG. 2. If the waiting line of connection i no longer contains any cell, the event value E1 is set to iL. In the sequence the VE1 sets the internal variable di to 0. Otherwise the event value E1 is set to iH. In that case the VE1 reads the time ti from the memory S1 (see FIG. 1) (or another relevant magnitude from which ti is determined) for the earliest possible departure of another cell of the connection i, and calculates the internal variable di for t-ti. From the memory S2 it obtains the bandwidth reciprocal value Ti of the connection i and from it calculates the reference magnitude Bi in accordance with the following formula:

$$B_i = \frac{[d_i]}{[T_i]}$$

meaning the largest whole number is determined, which is smaller or equal to the quotient of di and Tj. (The square parentheses represent the discreting operation—the content of the parenthesis is rounded up or down to the next whole number, depending on whether the upper or the lower transverse lines are missing from the complete square parenthesis).

The VE1 further determines an applicable reference magnitude Bj. No calculation needs to be performed if the event value E2 is 0; in that case a blank value is produced instead of Bj. Otherwise, if during time t a cell of connection j is read into the intermediate memory and this cell advances directly to the head of the waiting line, the VE1 then reads from the memory S1 the time tj for the earliest possible departure of a cell from the connection j, and calculates the internal variable dj for t-tj. From the memory S2 it obtains the reciprocal value Tj of the bandwidth of connection j and from it calculates the reference magnitude Bj in accordance with the following formula:

$$B_j = \frac{[d_j]}{[T_j]}$$

FIG. 2 schematically illustrates the sequence as a parallel process. Of course a serial design is also possible. Mixed designs can also be envisioned. Since identical operations must be performed for both connections, the configuration can use circuit parts with multiplex methods. The calculated reference magnitudes Bi and Bj can be routed to the second processing units in accordance with several known ways (bus, serial transmission with the VE2 listening for the addresses, transmitting during predetermined time slots, etc.). Since the first processing unit only needs to be present once for the shaper, when the expert designs the shaper he should locate the more circuit- and/or time-consuming parts in the VE1 and keep the VE2 as simple as possible. This also entails the choice of working with the bandwidth itself instead of with its reciprocal value Tk, and to perform multiplications instead of divisions.

The object of the second processing unit VE2 is to provide a rank for a predetermined connection, which contains the information about how urgently the read-out of the cell of this connection from the buffer is needed. The decisive factor on the one hand is the priority which belongs to this connection k, and on the other the time within the same priority class during which the cell had already waited for the read-out referring to the significant bandwidth for the connection, or its reciprocal value Tk. The last-named weighting is contained in the reference magnitude Bk, which increases continuously as time passes. The priority is determined from the type of transmission mode. Thus for example a cell of a CBR connection usually has precedence over a cell from an rt-VBR connection, and the latter in turn has precedence over a UBR connection—compare the transfer capabilities mentioned in the beginning. Since Bk only makes sudden changes when a cell departs or when the bandwidth is reestablished for the connection k, but otherwise only grows linearly with time, no actual calculation needs to take place in the VE2; updating the reference magnitude Bk and linking it to the priority is sufficient. Updating designates the tracking of a magnitude as a function of an event on the basis of a specified legality. In the simplest case this is the addition of a fixed amount at each clock. The increase can also be determined by a complex legality.

Figure 3:
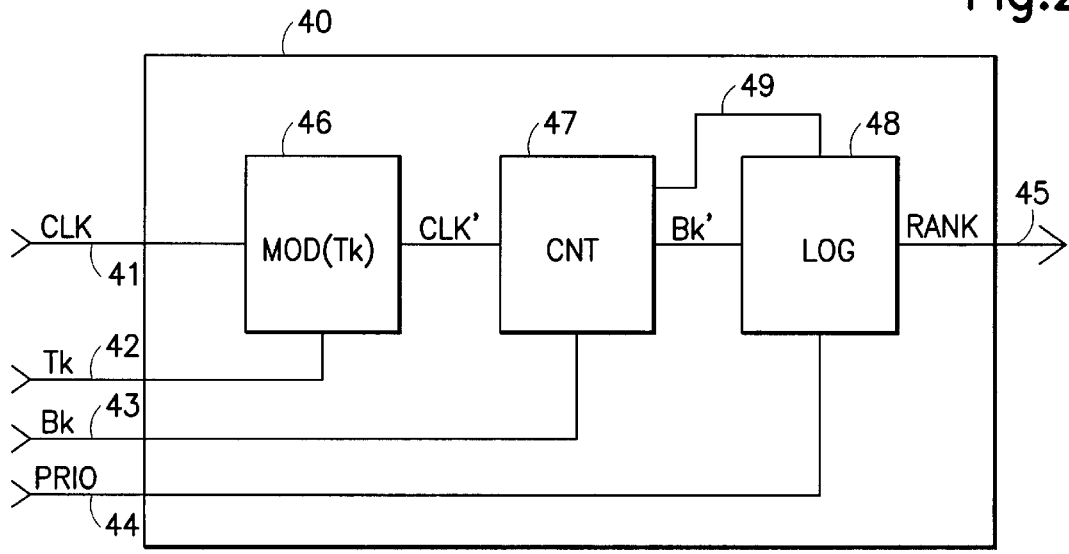
FIG. 3 a functional diagram of a second processing unit.

FIG. 3 schematically illustrates the function of a second processing unit 40 with an input for the clock CLK (41), the reciprocal value of bandwidth Tk (42), the reference magnitude Bk (43) and the priority PRIO (44) as well as an output for the rank (45). Between them is a first functional block 46 for the internal adaptation of the clock to the agreed bandwidth, a second functional block 47 for updating the reference magnitude in the internal clock, and a third functional block 48 for linking the weight to a priority and to the release control.

The cell clock or an auxiliary clock derived from it is located at the clock input 41. The cell clock is determined by the cell movements of all the connections, thus the cells in the data stream which arrive and depart from the buffer. The cell movements, which undergo time fluctuations as explained earlier, form the basis of the time calculations; the clock period Δ between two cell arrivals or departures and the number of clock periods are decisive. An auxiliary clock can contain a multiple of the cell clock frequency for example, and can be synchronized therewith despite the time fluctuations. But the time measured at the agreed parameter is significant for the individual connection. Therefore the update of the reference magnitude Bk is not brought about directly through the cell clock, but through a clock CLK' slowed by the factor of the reciprocal value Tk of the bandwidth. This clock adaptation takes place in the first functional block 46. It may contain for example a so-called bit rate multiplier, which subdivides an auxiliary clock that is many times higher than the cell clock. Or it contains an adjustable module counter with a balance transfer which operates in accordance with the following principle: The counter is incremented by the cell clock and is reset when the counter status exceeds a comparison value. At the start the comparison value is set to the base value, thus to Tk in the present application. When resetting the counter the excess count, meaning the difference between the last counted value and the comparison value, is deducted from the base value. The following applies with the base value Tk, the comparison value V and the respective counter status Z when resetting (Z=[V]), thus V(n+1):=Tk–(Z(n)–V(n)). The result is a slowed clock CLK' with clock periods of $[T_k]$ and $[T_k]$+1 in a ratio whose average corresponds to a clock Tk. An applicable parameter change of Tk can be introduced at any time without restarting and immediately leads to the desired new clock ratio.

The following rounding off balance from the reference magnitude calculation:

$$R_k = \frac{d_k}{T_k} - \frac{[d_k]}{[T_k]}$$

can be taken into account in any case for the comparison value when the counter is initialized. Adequate transmission possibilities must then be kept available. A variation to that end includes not rounding off Bk to a whole number but to transfer it as a quotients of di and Tk and only divide them in the second processing unit. The whole number portion is used as the reference magnitude in the specified manner, the rest is taken into account with the balance when initializing the comparison value of the module counter.

Updating the reference magnitude Bk takes place with the aid of the slowed clock CLK' in the second functional block 47. The latter can also contain a counter CNT for example which, each time a new reference magnitude Bk is calculated for the respective connection k, is set to the newly calculated value through the reference magnitude input 43. By definition the new value essentially states how many slowed clock periods must elapse until the next cell of this connection is allowed to depart (negative Bk) or has already departed (positive Bk). This magnitude is now continuously increased by the slowed clock CLK'. The reference magnitude Bk' updated in this manner must now be linked to the priority PRIO from the priority input 44, which takes place in the third functional block. This may be a simple binary register whose content is interpreted as a number, where the priority is written as a number into the more meaningful forward positions of the register. The number Bk' from the second functional block 47 is continuously written to the rear positions. The content of the register represents the desired rank. It is read out in a suitable manner through output 45, preferably to a memory S3 25 which the scheduler SCH 12 can access (FIG. 1). However, regardless of the priority a negative BK' must ensure that no cell is read out from this connection. This can be brought about for example with a flag bit which causes a blocking of the register, as indicated in FIG. 3 by the connection 49. The flagbit can be the MSB of the counter in the second functional block for example, which is used as an overwrite command for the register outputs, so that a 0 rank results from a negative weight, which is interpreted accordingly for the read-out.

The described design of the first and the second processing unit is a possible preferred embodiment of the invention, but not the only one. Thus it can be envisioned to define the reference magnitude in a different manner (Bv instead of B) for example, and to calculate Bvk in the first processing unit as $Bv_k=[d_k]$ and route it to the VE2 so that the VE1 only needs one of two connection parameters, the next possible departure time tk of a cell from the connection k. Updating Bvk to Bvk' in the VE2 then takes place with the cell clock, whereby the generation of a slowed clock and thus also a first functional block are omitted from the VE2. But with this variation the counter CNT in the second functional block must be able to manage much larger numbers; in low-frequency connections very many cell clock periods elapse until a cell departure takes place and the counter is reset. To obtain the weight Bk' from the adapted reference magnitude Bk', which is comparable to all other connections and takes the bandwidth of connection k into consideration, a further operation is required, namely the multiplication of Bvk' by the bandwidth 1/Tk. Therefore the third functional block is respectively more expensive.

What is claimed is:

1. A shaper for a stream of data packets, particularly an ATM traffic stream, with means (1, 12) for the intermediate storage and read-out of data packets from individual connections and the extraction of the packet clock, characterized by an evaluation unit (20) which determines the instant of the last read-out of a data packet during the packet clock period for each connection based on the current time, the agreed traffic parameters (tk, Tk) and the priority (PRIO) of a rank (Rank), wherein the rank comprises a mode class which determines the priority of the packet departure and a weight which is decisive for the sequence within the same mode class, and wherein the rank is decisive for the selection of the data packets to be read out next.

2. A shaper for a stream of data packets, particularly an ATM traffic stream, with means (1, 12) for the intermediate storage and read-out of data packets from individual connections and the extraction of the packet clock, characterized by an evaluation unit (20) which determines the instant of the last read-out of a data packet during the packet clock period for each connection based on the current time, the agreed traffic parameters (tk, Tk) and the priority (PRIO) of a rank (Rank) wherein the rank is decisive for the selection of the data packets to be read out next, wherein the shaper is further characterized by a means (25) connected downstream of the evaluation unit (20) for storing the determined ranks, and an evaluation and selection unit (12) which accesses the contents of the ranks, and in turn controls the read-out of the data packets from the means (11) for the intermediate storage of the data packets' individual connection.

3. A shaper as claimed in claim 2, characterized by a separate memory (22, 23) placed before the evaluation unit (20) for each type of agreed connection parameters (tk, Tk) whose contents are read as needed by the evaluation unit (20).

4. A shaper as claimed in claim 3, characterized by an evaluation unit (20) in the form of a first processing unit (21) for determining reference magnitudes (Bk) from the traffic parameters (tk, Tk) and from events (E1, E2) in traffic movements, and per connection of a second processing unit (24) connected downstream for the individual updating of the rank as a function of time and a part of the traffic parameter (Tk).

5. A shaper as claimed in claim 4, characterized in that the second processing unit (24, 40) contains a counter (47), which is set by the reference magnitude obtained from the first processing unit (21), which counts packet clocks in reference to a traffic parameter (Tk), and whose status together with the priority (PRIO) provides the rank (Rank).

6. A shaper as claimed in claim 2, characterized by an evaluation unit (20) in the form of a first processing unit (21) for determining reference magnitudes (Bk) from the traffic parameters (tk, Tk) and from events (E1, E2) in traffic movements, and per connection of a second processing unit (24) connected downstream for the individual updating of the rank as a function of time and a part of the traffic parameter (Tk).

7. A method of shaping a stream of data packets, particularly from an ATM traffic stream, while taking a priority into consideration and complying with agreed traffic parameters for each connection, where arriving data packets of individual connections are inserted into a waiting line and the packet clock is determined, characterized by the following process steps during a packet clock period:

Determining for each connection a reference magnitude (Bk) from the traffic parameters (tk, Tk) and the time (t) elapsed since the last packet departure;

Determining for each connection a rank (Rank) based on the priority (PRIO) and the reference magnitude (Bk);

Determining the connection with the highest rank, and

Read-out of the data packet of the determined connection from the waiting line.

8. A method as claimed in claim 7, characterized in that determining the connection with the highest rank encompasses the following steps:

Storing the newly established rank;

Searching the stored ranks for the highest ranked memory input respectively if several highest ranked inputs are stored, the next memory input, and determining the connection which belongs to the selected memory input.

9. A method as claimed in claim 8, characterized in that the reference magnitude (Bi, Bj) is calculated anew for the connection of the last departed data packet and/or the arriving data packet which goes directly to the head of the waiting line, and that the reference magnitudes (Bk) of all other connections are updated.

10. A method as claimed in claim 9, characterized by the following steps for determining the reference magnitudes (Bi, Bj):

Determining the connection i of a departing data packet;

Calculating a reference magnitude (Bi) for the departure time of a next data packet of connection i;

Determining a connection j of an arriving data packet, which advances immediately to the head position in the waiting line;

Calculating a reference magnitude (Bj) for the departure time of a next data packet of connection j, and Updating the reference magnitudes (Bk) of all other connections by means of an increment weighted with a traffic parameter.

11. A method as claimed in claim 7, characterized in that the reference magnitude (Bi, Bj) is calculated anew for the connection of the last departed data packet and/or the arriving data packet which goes directly to the head of the waiting line, and that the reference magnitudes (Bk) of all other connections are updated.

12. A shaper for a stream of data packets, particularly an ATM traffic stream, with means (1, 12) for the intermediate storage and read-out of data packets from individual connections and the extraction of the packet clock, characterized by an evaluation unit (20) which determines the instant of the last read-out of a data packet during the packet clock period for each connection based on the current time, the agreed traffic parameters (tk, Tk) and the priority (PRIO) of a rank (Rank) wherein the rank is decisive for the selection of the data packets to be read out next, wherein the shaper is further characterized by a separate memory (22, 23) placed before the evaluation unit (20) for each type of agreed connection parameters (tk, Tk) whose contents are read as needed by the evaluation unit (20).

* * * * *